Patented Nov. 11, 1941

2,262,431

UNITED STATES PATENT OFFICE 2,262,431

PROCESS OF PREPARING HIGH MOLECULAR WEIGHT FATTY ACID CHLORIDES

Anderson W. Ralston, Miles R. McCorkle, and Robert J. Vander Wal, Chicago, Ill., assignors to Armour and Company, Chicago, Ill., a corporation of Illinois No Drawing. Application October 24, 1939, Serial No. 301,084

6 Claims. (Cl. 260—408)

This invention relates to processes of preparing high molecular weight fatty acid chlorides and it comprises processes wherein saturated or unsaturated fatty acids having six or more carbon atoms are reacted with an excess of a phosphorus halide and the reaction product consisting of fatty acid chloride and excess phosphorus halide, is treated with water for the removal of the excess phosphorus halide as an acid of phosphorus.

The high molecular fatty acid chlorides, such as lauroyl chloride, stearoyl and the like are materials of increasing importance for the synthesis of new chemical compounds. For example, these fatty acid chlorides are useful in the preparation of ketonic compounds, esters, and other substances containing alkyl radicals of relatively high molecular weight. In recent years much attention has been directed to the preparation of organic compounds containing alkyl or alkylene radicals having six or more carbon atoms. One of the most convenient ways of making such compounds is by using fatty acid chlorides as the source of the high molecular weight alkyl radical.

Such fatty acid chlorides are customarily prepared by reacting the corresponding fatty acid with thionyl chloride, or a chloride of phosphorus, such as phosphorus trichloride and phosphorus pentachloride. The present invention deals with improvements in that process wherein phosphorus chlorides, or phosphorus halides in general, are used as the reagent for converting a higher fatty acid to its corresponding acid chloride.

When a fatty acid, such as stearic acid, is reacted with phosphorus trichloride an excess of phosphorus trichloride is always present to insure complete conversion of the fatty acid. Thus, for example, one molecular weight of phosphorus trichloride will, in theory, convert three molecular weights of a fatty acid to the corresponding fatty acid chloride. Phosphorous acid is a by-product of this reaction. When phosphorus pentachloride is used the reaction is similar to that when PCl₃ is used excepting that phosphorus oxychloride is formed rather than phosphorous acids. But, as stated, it is essential that an excess of the phosphorus halide be present. In consequence of this, the fatty acid chloride is always contaminated with unreacted phosphorus halide. The phosphorous acid, or phosphorus oxychloride obtained as one of the reaction products is insoluble in the fatty acid chloride and thus forms as a layer from which it can be removed from the reaction mixture by decantation. The phosphorous acid or phosphorus oxychloride, consequently, separates completely from the fatty acid chloride but the fatty acid chloride will contain unreacted phosphorus trichloride or pentachloride as the case may be.

Therefore, the problem in this art has been that of purifying the fatty acid chloride. On a small scale in the laboratory it is possible to remove unreacted phosphorus trichloride by vacuum distillation. But on a large works scale vacuum distillation is unsatisfactory. In the first place, phosphorus halides are highly corrosive. So are the fatty acid chlorides, and this requires distillation apparatus made from special, expensive metal alloys. In the second place, the amount of unreacted phosphorus halide in the fatty acid chloride is rather slight so that large quantities of fatty acid chloride must be subjected to distillation in order to remove very small quantities of phosphorus halide impurity.

It is, of course, highly undesirable that the fatty acid chloride contain phosphorus halide impurities because these substances contaminate chemical compounds prepared from the fatty acid chlorides. Since a major use for the fatty acid chlorides is in the esterification of alcohols, especially polyhydroxy alcohols, fatty acid chlorides entirely free of phosphorus halides must be used. Otherwise, a part of the alcohol reacts with the phosphorus halide to give chlorinated products which contaminate the final ester.

In our search for a method by which crude fatty acid chlorides could be freed of unreacted phosphorus halides we have made the surprising discovery that the halide can be hydrolyzed with water or other hydrolyzing agent, such as methyl or ethyl alcohol, without the water reacting with the higher fatty acid chloride. Normally it would be expected that the fatty acid chloride would also hydrolyze in the presence of the water to give free fatty acid. On the contrary, however, we have discovered that the phosphorus halides can be completely converted to the corresponding acid of phosphorus by water without effecting any substantial hydrolysis of the high molecular weight fatty acid chloride present. After the hydrolysis is completed we then have a reaction mixture consisting of a layer of substantially pure fatty acid chloride and a layer of phosphoric or phosphorous acid which can be readily separated from the fatty acid chloride by stratification.

In broad aspects then, our invention consists in treating crude fatty acid chloride mixtures containing unreacted phosphorus halides with water or other hydrolyzing agent to convert the phosphorus halide to its corresponding acid.

The present invention is applicable to the purification of any fatty acid chloride having at least six carbon atoms. These acid chlorides can be saturated or unsaturated. The present invention is also applicable to fatty acid chlorides containing either phosphorus trichloride or phosphorus pentachloride as the phosphorus halide. Since the fatty acid chlorides are of chief interest in the arts we shall describe our invention more particularly with reference thereto. But other fatty acid halides can be freed from the phosphorus halide therein in exactly the same manner.

We shall now give examples showing how our invention may be practised.

Example 1

3000 parts by weight of lauric acid are reacted with 800 parts by weight of phosphorus trichloride. This is more than enough phosphorus trichloride as required by theory. The reaction mixture is allowed to stand until there is a clear separation of an upper layer consisting of lauroyl chloride containing excess phosphorus trichloride and a lower layer of phosphorous acid. The lower layer is removed by drawing off from the upper layer and the upper layer than washed with water. In this example, 162 parts by weight of water are slowly added to the lauroyl chloride layer with constant stirring, the mixture is then allowed to settle whereby a lower phosphorous acid layer is formed. This lower phosphorous acid layer is then removed leaving the lauroyl chloride substantially pure and free of phosphorus compounds.

Example 2

2840 parts by weight of stearic acid are admixed with 504 parts by weight of phosphorus trichloride, together with about 1000 parts by weight of carbon tetrachloride. The carbon tetrachloride acts as a mutual solvent for the reaction mixture. No heat need be applied to facilitate conversion of the stearic acid to stearoyl chloride. The reaction mixture is then allowed to settle and the lower layer of phosphorous acid separated off. The upper layer consisting of stearoyl chloride dissolved in carbon tetrachloride is then reacted with 75 parts by weight of water with constant stirring. The phosphorus trichloride in the upper layer is thus converted to phosphorous acid which separates as a lower layer and can be readily removed.

The upper layer of stearoyl chloride dissolved in carbon tetrachloride can be used directly for the preparation of aryl-alkyl ketones by a Friedel-Crafts reaction. The resulting Friedel-Crafts reaction mixture forms no emulsion on hydrolysis whereas if the fatty acid chloride were used directly in a Friedel-Crafts reaction without first removing excess phosphorus halide emulsions would tend to form.

Example 3

2800 parts by weight of linolenic acid are reacted with 504 parts by weight of phosphorus trichloride. The reaction mixture is then treated as described under Example 1, 75 parts by weight of water being used for the purpose of hydrolyzing unreacted phosphorus trichloride in the linolenoyl chloride layer.

Instead of using water as a hydrolyzing agent we can, of course, use the lower aliphatic alcohols, such as methyl or ethyl alcohol. But for the purpose of economy we prefer to use water.

Our process, as stated, is applicable to the purification of all crude fatty acid chlorides having six or more carbon atoms and containing phosphorus halides. For example, such acid chlorides are caproyl, capryl, oleoyl, linoleoyl, as well as those more specifically described above.

In no case need the reaction mixture be heated to facilitate reaction between the fatty acid and the phosphorus halide, and we need not apply heat in the hydrolyzing step.

Having thus described our invention, what we claim is:

1. In the preparation of fatty acid chlorides having at least six carbon atoms by reacting the corresponding fatty acid with a phosphorus halide used in excess, the method of removing unreacted phosphorus halide from the fatty acid chloride thus prepared which comprises hydrolyzing the unreacted phosphorus halide to its corresponding acid and then separating the acid from the thus purified fatty acid chloride.

2. In the process of preparing fatty acid chlorides containing at least six carbon atoms by reacting the corresponding fatty acid with phosphorus trichloride used in excess, the method of removing unreacted phosphorus trichloride from the fatty acid chloride thus obtained which comprises admixing water with the fatty acid chloride to convert the phosphorus trichloride to phosphorous acid, and then separating the phosphorous acid from the fatty acid chloride.

3. The process as in claim 2 wherein the fatty acid contains eighteen carbon atoms.

4. The process of preparing acid chlorides of fatty acids containing at least six carbon atoms which comprises reacting the fatty acid with an excess of a phosphorus chloride, separating a crude fatty acid chloride containing unreacted phosphorus chloride from the reaction mixture, hydrolyzing the unreacted phosphorus chloride, and separating the fatty acid chloride from the reaction products.

5. The process of preparing acid chlorides of aliphatic acids containing at least six carbon atoms which comprises reacting a fatty acid with phosphorus trichloride, the amount thereof being in excess of that required by theory, to give a reaction mixture consisting of fatty acid chloride containing unreacted phosphorus trichloride and a stratified layer of phosphorous acid, separating the phosphorous acid from the fatty acid chloride, then adding water to the fatty acid chloride to convert phosphorus trichloride therein to phosphorous acid, and finally separating the thus formed phosphorous acid from the purified fatty acid chloride.

6. The process as in claim 5 wherein the fatty acid contains eighteen carbon atoms.

ANDERSON W. RALSTON.
MILES R. McCORKLE.
ROBERT J. VANDER WAL.